US008539013B2

(12) United States Patent
Ganai et al.

(10) Patent No.: US 8,539,013 B2
(45) Date of Patent: Sep. 17, 2013

(54) EFFICIENT DECISION METHOD FOR REAL NON-LINEAR ARITHMETIC CONSTRAINTS

(75) Inventors: Malay K. Ganai, Plainsboro, NJ (US); Franjo Ivancic, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 879 days.

(21) Appl. No.: 12/709,947

(22) Filed: Feb. 22, 2010

(65) Prior Publication Data

US 2010/0281086 A1    Nov. 4, 2010

Related U.S. Application Data (60) Provisional application No. 61/174,139, filed on Apr. 30, 2009, provisional application No. 61/179,780, filed on May 20, 2009.

(51) Int. Cl.
*G06F 7/38* (2006.01)
*G06F 17/00* (2006.01)

(52) U.S. Cl.
USPC .............................. 708/446; 708/441; 706/46

(58) Field of Classification Search
USPC .................... 708/441, 446; 717/126; 706/46
See application file for complete search history.

(56) References Cited

U.S. PATENT DOCUMENTS

| 2004/0019468 | A1* | 1/2004 | De Moura et al. | 703/2 |
| 2005/0171747 | A1* | 8/2005 | Franco et al. | 703/2 |
| 2007/0118340 | A1* | 5/2007 | Geist et al. | 703/2 |

OTHER PUBLICATIONS

Bauer, A., et al. "Tool-Support for the Analysis of Hybrid Systems and Models" Proceedings of the 2007 Conference on Design, Automation and Test in Europe (DATE). Apr. 2007. pp. 924-929.

Franzle, M., et al. "Efficient Solving of Large Non-Linear Arithmetic Constraint Systems With Complex Boolean Structure" Journal on Satisfiability, Boolean Modeling and Computation. vol. 1. May 2007. pp. 209-236.

Ganai, M. "Efficient Decision Procedure for Bounded Integer Non-Linear Operations Using SMT(LIA)" Hardware and Software: Verification and Testing, 4th International Haifa Verification Conference, HVC 2008. Oct. 2008. pp. 1-15.

Walther, J. "A Unified Algorithm for Elementary Functions" Proceedings AFIPS Spring Joint Computer Conference. 1971. pp. 379-385.

* cited by examiner

*Primary Examiner* — Chuong D Ngo
(74) *Attorney, Agent, or Firm* — Joseph Kolodka (57) ABSTRACT

A system and method for solving a decision problem having Boolean combinations of linear and non-linear operations includes translating the non-linear real operations using a COordinate Rotation DIgital Computer (CORDIC) method programmed on a computer device into linear operations maintaining a given accuracy. Linear and translated linear operations are combined into a formula. Satisfiability of the formula is solved using a decision procedure for Boolean combinations of linear operations over integers and reals.

18 Claims, 2 Drawing Sheets

EFFICIENT DECISION METHOD FOR REAL NON-LINEAR ARITHMETIC CONSTRAINTS

RELATED APPLICATION INFORMATION

This application claims priority to the following provisional applications: Ser. No. 61/174,139 filed on Apr. 30, 2009 and Ser. No. 61/179,780 filed on Jun. 20, 2009, both incorporated herein by reference.

BACKGROUND

1. Technical Field

The present invention relates to computer program verification and decision making, and more particularly to decision making methods for programs including Boolean combinations of linear and non-linear constraints including algebraic and transcendental functions.

2. Description of the Related Art

Verification of hybrid discrete-continuous and embedded control systems may require the solving decision problems comprising Boolean combinations of linear and non-linear operations, involving transcendental and algebraic functions over reals. In general, the problem is undecidable. However, for given precision requirements, the problem becomes decidable. Therefore, one can hope that a solver can at least provide a soundness guarantee, wherein soundness implies that the solver cannot err on an unsatisfiability decision. It can also provide a completeness guarantee up to a given non-zero precision bound, wherein completeness implies that the solver cannot err on a satisfiability decision. Such guarantees are useful for analyzing instability of systems implemented using imprecise arithmetic.

There are many advanced tools in the field of Operation Research (OR) for solving linear and non-linear arithmetic optimization and feasibility problems. However, even for the linear arithmetic, these tools can give incorrect results due to the internal use of floating-point arithmetic (which is inherently imprecise due to unavoidable rounding errors). Though for OR applications such inaccuracies are acceptable in general, however for verification applications, exactness in the results is inherently important, especially, in dealing with strict inequalities and dis-equalities.

With the growing use of high-level design abstraction to capture today's complex design features, the focus of verification techniques has been shifting from propositional reasoning to decision procedures known as Satisfiability Modulo Theory (SMT) solvers. These solvers are geared towards addressing the issue of performance, without compromising the accuracy. A SMT problem for a theory T, denoted as SMT (T) comprises a Boolean combination of theory T; given a formula $\phi$, determine whether $\phi$ is T-satisfiable, i.e., whether there exists a model of T that is also a model of $\phi$.

Linear arithmetic OR solvers are based on precise arithmetic; however there is a significant performance hit in comparison with the SMT solvers for linear arithmetic. For any arbitrary non-zero precision, previous SMT-style approaches, based on floating-point arithmetic, are neither sound nor complete.

iSAT is a tight integration of a SAT-based proof search with interval-based arithmetic constraint propagation for reasoning over the arithmetic domain of Boolean combinations of non-linear constraints involving transcendental functions. Absolver is an SMT solver addressing a blend of Boolean and polynomial arithmetic constraint problems. It is an extensible and modular implementation of the SMT scheme which permits integration of various subordinate solvers for the Boolean, linear, and non-linear parts of the input formula. Absolver itself coordinates the overall solving process and delegates the currently active constraint sets to the corresponding subordinate solvers. For solving non-linear constraints, it uses a numerical optimization tool (IPOPT) for solving the non-linear constraints. Consequently, it may produce incorrect results due to the local nature of the solver, and due to rounding errors.

SUMMARY

A system and method for solving a decision problem in a program having Boolean combinations of linear and non-linear operations includes translating non-linear operations into linear operations using a COordinate Rotational DIgital Computer (CORDIC) method programmed on a computer device to provide a formula with a Boolean combination of only linearized operations, compatible with a Satisfiability Modulo Theory for Linear Arithmetic solver (SMT(LA)). An interval search is performed using a branch and bound style interval search method (or a DPLL-style Interval Search (DISE) method) to determine a satisfiable interval range to provide a sound solution to the decision problem for the interval range.

A method for solving a decision problem having Boolean combinations of linear and non-linear operations includes translating the non-linear real operations using a COordinate Rotation DIgital Computer (CORDIC) method programmed on a computer device into linear operations maintaining a given accuracy; combining linear and translated linear operations into a formula; and solving satisfiability of the formula using a decision procedure for Boolean combinations of linear operations over integers and reals.

In other embodiments, translating may include normalizing one or more non-linear inputs with respect to corresponding variable interval bounds. The variable interval bounds on the non-linear inputs may have a fixed ratio of upper to lower bounds. The decision procedure may include an interval search procedure that determines whether the formula is satisfiable or not based on whether a feasible combination of interval bounds exists or not, respectively. The interval search procedure may determine the feasibility of interval combinations of the non-linear inputs by searching over lower and upper bounds of the interval iteratively, by employing results from previous iterations. The interval search procedure may include employing a lazy bound refinement that employs refinement-based reasoning iteratively to explore combinations of interval bounds. The lazy bound refinement may employ a branch and bound-style interval search wherein infeasible interval combinations are learned from previous iterations, and not visited in a subsequent search. The lazy bound refinement may employ a branch and bound-style interval search wherein partial feasible interval combinations from previous iterations are used in guiding the subsequent search.

The method may further include accounting for inaccuracies in the CORDIC method by computing error correction and including error correction terms in the translating step. The non-linear operations may include transcendental and algebraic functions over real numbers with a given precision. The decision procedure may include employing a Satisfiability Modulo Theory for Linear Arithmetic solver (SMT(LA)). The method may be employed for verifying the linear and non-linear operations in computer software.

A system for solving a decision problem having Boolean combinations of linear and non-linear operations includes a computer configured to translate non-linear real operations using a COordinate Rotation DIgital Computer (CORDIC) method programmed on the computer into linear operations maintaining a given accuracy, the computer configured to combine linear and translated linear operations into a formula; and a Satisfiability Modulo Theory for Linear Arithmetic solver (SMT(LA)) configured to solve satisfiability of the formula wherein the solving includes at least one of normalizing one or more non-linear inputs with respect to corresponding variable interval bounds and solving the formula by an interval search procedure that determines whether the formula is satisfiable or not based on whether a feasible combination of interval bounds exists or not, respectively.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In application domains such as hybrid discrete-continuous systems, one encounters verification related decision problems involving Boolean combinations of linear/non-linear constraints including algebraic and transcendental functions. These decision problems are in general un-decidable. However, for given non-zero precision requirements, the problem becomes decidable. For verification applications, accuracy of a decision procedure is needed. Previous approaches based on finite precision floating-point arithmetic are neither sound nor complete.

For given non-zero but arbitrary precision requirements, an efficient CORDIC-based decision procedure (CORD) for nonlinear decision problems is provided using CORDIC methods, and off-the-shelf SMT(LA) (Satisfiability Modulo Theory for Linear Arithmetic) solver that uses infinite precision arithmetic (also referred to as a SMT(LA) (Satisfiability Modulo Theory for Linear Arithmetic) solver). The SMT (LA) is an SMT solver for linear arithmetic, while a SMT (LRA) is an SMT solver for linear real arithmetic. The SMT (LA) includes the SMT(LRA). The SMT(LA) handles linear operations that could be on real or on integer types.

Non-linear parts of the problem are translated to formulae compatible with SMT(LA) using CORDIC algorithms, accounting for all the inaccuracies in such translation. In the translation, a normalization scheme is employed, combined with parameterized scaling of the input/output domains of non-linear operations. On the translated formula, we devise a Davis-Putnam-Logemann-Loveland (DPLL)-style Interval Search Engine (DISE) that explores combinations of interval bounds. We employ a branch and bound style interval search method. The DISE uses a SMT(LA) solver to check the feasibility of interval combinations in conjunction with the translated formula and the linear part of the original non-linear problem. The decision procedure is sound and complete for any arbitrary non-zero precision requirements. In experiments, we demonstrate the efficacy of our approach, and compare it with the state-of-the-art decision procedure proposed recently.

The present embodiments solve real non-linear arithmetic decision problems involving transcendental and algebraic operations with a state-of-the-art SMT Linear Arithmetic solver, using suitable "linearization" encoding. CORDIC algorithms are employed to linearize the non-linear arithmetic constraints for a given precision bound. A normalization scheme is used, combined with an iterative bound refinement method to reduce the size of the linearized formula needed to meet the given precision bound. The bound refinement method explores various combinations of interval bounds using a refinement-based search. In other words, the approach is geared towards efficient problem formulation for SMT (LA) solver. For a given decision problem with non-linear fragments, the present approach is geared towards solving quickly to meet the given precision bound. An efficient problem formulation is combined with a state-of-the-art linear arithmetic solver to devise a decision procedure to solve the problem efficiently.

Given a decision problem with linear and non-linear operations on reals, we encode the non-linear operations using the CORDIC methods. We then present the linearized formula to a lazy bound refinement (LBR) method. LBR uses the SMT (LA) solver to explore various combination of interval bounds in a refinement-based search. The lazy bound refinement uses a branch and bound-style interval search wherein infeasible interval combinations are learned from previous iterations, and not visited in a subsequent search, and partial feasible interval combinations from previous iterations are used in guiding the subsequent search.

In accordance with the present principles, given a precision bound, the decision problem is translated with non-linear operations on reals, exactly to linear arithmetic and Boolean constraints that can be solved by the SMT(LA) solvers. Encoding is transparent to the solver, and can be easily plugged into the existing infrastructure. This solution is particularly useful for non-linear operations including transcendental and algebraic functions over reals with a given precision. The lazy bound refinement does not change a ratio of upper to lower bounds at every refinement. Instead, it uses refinement-based reasoning to explore the various combination of interval bounds. Normalization of one or more non-linear inputs with respect to corresponding variable interval bounds with a fixed ratio of upper to lower bound are employed in the solution.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
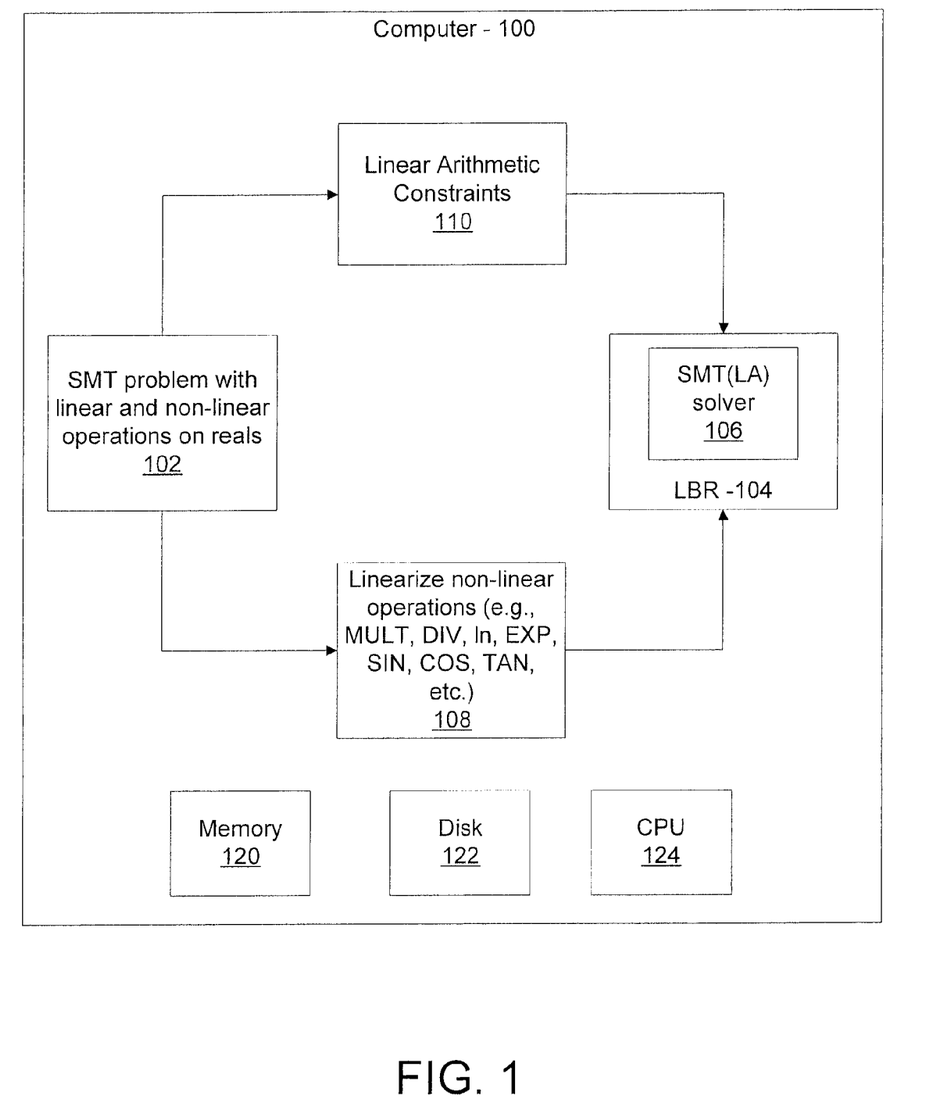
FIG. 1 is a block/flow diagram for a system/method for a decision procedure in accordance with the present principles.

Referring now to the drawings in which like numerals represent the same or similar elements and initially to FIG. 1, a system and method for making decisions in a verification procedure including Boolean combination of linear and non-linear logic is shown in accordance with the present principles. In the illustrative embodiment, a decision procedure employs a CORD computer 100 to efficiently maneuver large search space of Boolean combinations of the linear and non-linear arithmetic. This enables the use of SMT solvers 102 for linear arithmetic. The CORD computer 100 translates a given non-linear formula $\phi$ to an SMT(LA) formula, for a given non-zero precision. The translated formula is solved by a DPLL-style Interval Search Engine (DISE) 104 built over an off-the-shelf SMT(LA) solver 106 that provides exact results for an SMT(LA) formula. The approach is both sound, and complete for a given precision bound.

The CORD computer 100 uses CORDIC methods to translate the nonlinear arithmetic into linear arithmetic. CORDIC methods are known for other purposes as ways to compute transcendental and algebraic functions using only adders and shifters in a finite recursive formulations. The number of recursive steps is determined by the accuracy of the precision required. Hardware devices such as calculators and signal processing applications make use of such efficient computations to meet the stringent area constraints. However, inaccuracies in such translations are unavoidable due to finite recursive formulations. Bounds on the numerical inaccuracies for such translations have been described in the art. These results have been employed to account for all the inaccuracies in the present translations to the SMT(LA) formula.

In the translation in block 108, a normalization scheme, combined with parameterized scaling of the input/output domains of non-linear operations in a given formula $\phi$ to obtain an SMT(LA) formula $\hat{\phi}$. This scheme guarantees a bounded precision loss when the inputs are normalized. The normalization and scaling is employed to "linearize" a non-linear operation(s) (block 106). On the translated formula $\hat{\phi}$, we devise a DPLL-style Interval Search Engine (DISE) 104 that explores all combinations of interval bounds. It uses a SMT(LA)-solver 106 to check the feasibility of a combination in conjunction with the translated formula and a linear-part of $\phi$ in block 110.

The incremental solving capabilities of the SMT(LA)-solvers 106 formulates each subproblem incrementally. Hard and soft constraints are used to guide the choice of interval bounds. If some such interval bounds are found to be consistent with $\hat{\phi}$, the procedure declares the given decision problem $\phi$ satisfiable. On the other hand, if no such interval bounds are found feasible, it declares $\phi$ unsatisfiable. The present embodiments can handle non-linear twins involving transcendental functions (e.g., exp, ln, sin, cos, tan, etc.) and includes non-linear functions, such as, multiplication and division.

The CORD computer 100 may include any general purpose computer adapted to perform the decision procedure in accordance with the present principles. For example, computer 100 may include memory 120 or work in conjunction with memory storage devices including but not limited to disks 122 or other storage media. The computer 100 may include a computer processing unit (CPU) 124 and other peripheral and interface devices.

In accordance with the present principles, decision problems are considered with Boolean expressions bool-expr and bool term expressions real-expr (mixed expression). Real term expressions comprise-linear operations such as addition (+), subtraction (−), multiplication by constant c (·c); non-linear algebraic operations such as multiplication (·), division (/), nth root, etc.; non-linear transcendental operations such as sin, cos, tan, cot, sec, exp, log, etc.—real-var (real variables) or real-expr. Boolean expressions include Boolean operations such as "and" ($\wedge$), "or" ($\vee$), "xnor" ($\otimes$), and "not" (−) on bool-var (Boolean variables) or bool-expr. Boolean expressions also include relation operators $\bowtie \in \{=, \leq, <, \geq, >\}$ which are expressed on two bool-expr terms x, y, i.e., $x \bowtie y$. We use ITE (bool-expr, real-expr, real-expr) as a shorthand to denote the "if-then-else" operator.

For a given decision problem $\phi$ with Boolean and bool terms, we use B to denote the set of bool-expr, and R denotes the set of bool-expr. These expressions are interpreted over some valuations $\sigma = \sigma_B \times \sigma_R$ (1), where $\sigma_B: B \rightarrow \{\text{false, true}\}$ and $\sigma_R: R \rightarrow \Re$ (2). ($\Re$ is the set of real values). We also use $\sigma_B(b)$ to denote the value of b∈B, and $\sigma_R(r)$ to denote the value of r∈R. We drop the subscripts B, R for ease of readability.

Satisfiability Modulo Theory (SMT) is the problem of deciding the satisfiability of a first-order formula with respect to a background decidable first-order equational theory T (SMT (T)). We focus on deciding quantifier-free formulas (mixed expressions) by translating real-expr terms (108) to the theory of linear bool arithmetic SMT (LRA) (106), that gives an exact answer (by using precise arithmetic). We define LRA-var as a theory variable interpreted in the domain of LRA, and LRA-term as a first-order term build from linear operators (+, −, ·) and LRA-var. A theory of LRA constitutes a conjunction of bool linear arithmetic constraints (LAC) $\Sigma_i a_i \cdot x_i \leq d$, where $a_i$ is a rational constant. A SMT (LRA) problem is a problem of deciding satisfiability of Boolean expressions obtained on applying Boolean connectives on propositional atoms and relational operators $(=, \leq, <, \geq, >)$ on two LRA-terms.

There has been extensive research on checking the decidability of LAC over bool domain, in both operational research and verification applications. However, there is a difference in the goals of the LRA solvers in the respective domains. The truthfulness of the outcome is not as critical in the operational research applications, but it is needed in the verification applications. To meet the exactness, the solvers for verification approaches usually employ rational arithmetic (a precise arithmetic), which usually incurs high computation cost. To overcome this, researches have attempted to minimize rational arithmetic operations with floating-point arithmetic with error correction. For the present decision procedure, we only need that a SMT (LRA)-solver decides exactly on a given SMT (LRA) formula.

For efficiency reasons, we focus on DPLL-based SMT (LRA)-solvers that solve SMT (LRA) formulae by combination of Boolean SAT and LRA-solver using Simplex-based methods. There has been a lot of research to devise incremental solvers to explore the sharing that are present in the successive LAC problems during the search process. Some of the Simplex-based methods use incremental versions; a tableau is constructed where rows (corresponding to LAC) are added and deleted incrementally during a DPLL search. Such incremental updates of the tableau are expensive. To reduce the cost, the solver operates on a transformed problem where the tableau is fixed (i.e., rows are not added/deleted) during the decision process, but constraints corresponding to variable-bounds change during the search. A SMT (ERA) formula $\psi$ is first transformed into an equi-satisfiable formula $\psi_{eqn}$ ($\wedge$) $\psi_{pred}$, where the formula $\psi_{eqn}$ represents the conjunction of linear equations Ax=0, and $\psi_{pred}$ represents the Boolean combination of predicates of the form $x \bowtie b$ where $\bowtie \in \{=, \leq, <, \geq, >\}$ and b is a rational constant. Note, that the matrix A is fixed during the decision process. It is the set of inequalities of the form $\underline{x_i} \leq x_i \leq \overline{x_i}$ that changes during the decision process where $\underline{x_i}$, $\overline{x_i}$ correspond to the lower and upper bounds of each variable $x_i$, respectively. We also use $x_i \in [\underline{x_i}, \overline{x_i}]$ to denote the interval bound of $x_i$. These inequalities can be asserted/retracted efficiently without undoing the previous pivoting operations. We exploit this incremental capability in our decision procedure CORD.

CORDIC methods: CORDIC (COordinate Rotation Digital Computer) was first proposed for computing many elementary functions, using only adders and shifters in finitely many iterative steps. Such an efficient computation has been widely used in several signal processing computing algorithms such as Fourier transformation, and lattice filtering. The basic task performed is to rotate a vector in a 2D-plane through an angle in a linear, circular or hyperbolic coordination systems.

There are two modes of operations, vectoring (a.k.a backward), and rotation (a.k.a forward). In vectoring mode, a given vector $(x, y)$ (represented in a 2D-plane) is rotated to the X-axis to obtain a new coordinate $(x', y') = (\sqrt{x^2 + y^2}, 0)$, so that the length of the vector, and angle of inclination can be computed. In the rotation mode, the vector $(x, y)$ is rotated over a given angle $\alpha$ to compute a new coordinate $(x', y')$. A key point in such computation is to approximate a rotation with a sequence of micro-rotations $\alpha_k$ with $k \in \{0, \ldots, n-1\}$, $$0 < \alpha_k \leq \frac{\pi}{2}$$

such that the new coordinate can be computed easily using adders and shifters. Using such a simple principle, one can compute a wide range of elementary functions using a linear structure that is finitely large.

A unified algorithm providing the basic computation using triplets $(x_k, y_k, z_k)$ with $0 \leq k < n$ is described in the following. These triples define the general recursion for computing elementary functions, wherein $(x_0, y_0)$ is needed to be rotated by an angle $z_0$ in rotation mode, and to the X-axis in vectoring mode.

$$x_{k+1} = x_k - m \cdot \delta_{m,k} \cdot y_k \cdot 2^{-\tau_{m,k}} \tag{3}$$

$$y_{k+1} = y_k + \delta_{m,k} \cdot x_k \cdot 2^{-\tau_{m,k}} \tag{4}$$

$$z_{k+1} = z_k - \delta_{m,k} \cdot \alpha_{m,k} \tag{5}$$

In the above equations, $m \in \{0, +1, -1\}$ with $m=0$ corresponds to a linear rotation, i.e., to obtain product or quotient; $m=1$ corresponding to a circular rotation, i.e., to obtain sin, cos, etc.; $m=-1$ corresponding to a hyperbolic rotation, i.e., to obtain sin h, cos h, exp, log, etc. $\tau_{m,k}$ is a non-decreasing integer shift sequence satisfying $\tau_{m,k} \leq \tau_{m,i+1} \leq \tau_{m,k}+1$, that is chosen uniquely for a given m. The angle rotation in the kth iteration is:

$$\alpha_{m,k} = m^{-1/2} \tan^{-1}(m^{-1/2} \cdot 2^{-\tau_{m,k}}) \tag{6}$$

$\delta_k (=\pm 1)$ are chosen during the iteration so that the desired value is reached. In vectoring mode, the sign of $\delta_k$ is the same as $x_k \cdot y_k$ such that $|y_{k+1}| < |y_k|$; while for rotating mode, the sign of $\delta_k$ is the same as $z_k$, such that $|z_{k+1}| < |z_k|$.

Consider the vectoring mode. The choice of $\delta_k$ ensures that $$|z_{k+1}| = ||z_k| - \alpha_{m,k}|. \tag{7}$$

For z to converge to within $\alpha_{m,n-1}$, the following two conditions should be satisfied. Condition 1: The total rotation angle can not exceed the total sum of rotations, denoted as $\alpha_{max}$.

$$|z_0 - z_n| \leq \alpha_{max} \stackrel{def}{=} \sum_{i=0}^{n-1} \alpha_{m,k} \tag{8}$$

This constrains the values which $x_0$, $y_0$ may take, limiting the domain of convergence. Condition 2: The sum of remaining rotations at each step should be sufficient to bring the angle to at least within $\alpha_{m,n-1}$, i.e., $$\alpha_{m,k} - \sum_{j=k+1}^{n-1} \alpha_{m,j} < \alpha_{m,n-1}. \tag{9}$$

Similar conditions apply for the rotation mode.

Block 108 translates non-linear terms to linear terms. For simplicity, we focus on translation of non-linear operations involving multiplication and division, obtained using linear rotations of CORDIC methods. However, the translation process is applicable to any non-linear operations.

Multiplication: A multiplication $p = s \cdot t$ can be encoded using a Boolean combination of LAC by applying the CORDIC steps in Eq. (3) in rotation mode with $m=0$, $(x_0 = s, y_0 = 0, z_0 = t)$, $\alpha_k = 2^{-k}$ and $\tau_{m,k} = k$ as follows:

$$y_{k+1} = y_k + \delta_{m,k} \cdot x_k \cdot 2^{-k} \tag{10}$$

$$z_{k+1} = z_k - \delta_{m,k} \cdot 2^{-k} \tag{11}$$

where $\delta_k = \text{ITE}(z_k \geq 0, 1, -1)$. The nth iteration value $y_n$ gives the "CORDIC approximation" to $s \cdot t$. We use cordicMult $(s, t)$ to denote the CORDIC steps in Eqs. 10-11 to compute $y_n$.

To satisfy the domain of convergence criteria in Eq. (8), t should be in the interval $[-2, 2]$. For this input domain, an approximation error (an absolute error) introduced by CORDIC method is as follows:

$$err_{abs} \stackrel{def}{=} |y_n - p| = |z_n| \cdot |x_0| \leq 2^{-(n-1)} \cdot |x_0| \tag{12}$$

where p is the exact result. The upper bound on $err_{abs}$ will be referred to as absolute error tolerance.

In floating-point arithmetic, one needs to consider approximations due to rounding error. However, since use exact arithmetic, we only need to account for the approximation error in Eq. (12) and add a suitable error correction mechanism. A relative error in the computation of Eq. (10) is given as follows:

$$err_{rel} \stackrel{def}{=} \frac{|y_n - p|}{|p|} = \frac{|z_n|}{|t|} \leq \frac{2^{-(n-1)}}{|t|} \tag{13}$$

Clearly, $err_{rel}$ computed tends to go up as $|t| \to 0$. Though increasing n reduces $err_{rel}$ in general, we introduce a normalization scheme that reduces $err_{rel}$, when $|t| \to 0$. With such a scheme, we meet a small precision bound requirement with small n, i.e., small iterative steps. (We assume that the other input $x_0 (=s)$ is bounded. Further, a smaller iterative structure also implies a smaller translated SMT (LRA) formula).

Normalization Scheme: When t is in the interval $[1, 2]$ there are $2^{n-2}$ possible discrete representations of $z_n$ as indicated below.

$$z_n = 2^0 + 2^{-1} + \delta_2 2^{-2} + \ldots + \delta_{n-1} 2^{-(n-1)}. \tag{14}$$

Similarly, for $t \in [0.5, 1]$, there are $2^{n-3}$ possible discrete representations of $z_n$, and so and so forth. As $t \to 0$, there are fewer representations of $z_n$, implying $err_{abs}$ goes up.

To bound the $err_{abs}$ for $|t| < 1$, we normalize the input $t = tm \cdot 2^{E_t}$ such that $1 \leq |tm| \leq 2$. Such a scheme is intended to handle the large input domain, i.e., $|t| \geq 2$. If the absolute error tolerance needed is $2^{-(m-1)}$ where $m \gg n$, we normalize the input t as long as $E_t \geq -(m-n)$. Note that such a normalization meets the absolute error tolerance with a small n.

Error Correction:

We add the following error correction term $ec_{mult}$ to the result $y_n$.

$$y'_n = y_n + \underbrace{e \cdot x_0 \cdot 2^{-(n-1)}}_{ec_{mult}} \qquad (15)$$

where e is a real-var in the interval range $[-1, 1]$, introduced for each multiplication operation. We obtain corresponding error tolerances, as follows:

$$err'_{abs} \stackrel{def}{=} |y'_n - p| \leq 2^{-(n-2)} \cdot |x_0| \qquad (16)$$

$$err'_{rel} \stackrel{def}{=} \frac{|y'_n - p|}{|p|} = \leq \frac{2^{-(n-2)}}{|t|} \qquad (17)$$

To maintain the precision of n, we need one additional iterative step. We later show that such an error correction term is needed to guarantee soundness to our decision procedure.

Division: Similar to multiplication, a division $q=s/t$ can be encoded using a Boolean combination of LAC by applying the CORDIC steps in Eq. (3) in vector mode with $m=0$, $(x_0=t, y_0=s, z_0=0)$, $\alpha_k = 2^{-k}$ and $\tau_{m,k} = k$.

$$y_{k+1} = y_k + \delta_k \cdot x_k \cdot 2^{-k} \qquad (18)$$

$$z_{k+1} = z_k - \delta_k \cdot 2^{-k} \qquad (19)$$

where $\delta_k = \text{ITE}(y_k \geq 0 \otimes x_k \geq 0, -1, 1)$. (Recall, $\otimes$ is an "xnor" operation). The resultant value $z_n$ gives the "CORDIC approximation" as $s/t$. We use cordicDiv $(s, t)$ to denote the CORDIC steps in Eqs. 18-19 to compute $z_n$. To satisfy the domain of convergence criteria in Eq. (8), $s/t$ should be in the interval $[-2, 2]$. For this input domain, the approximation error in Eq. (13) (absolute error) introduced by the CORDIC method is as follows:

$$err_{abs} \stackrel{def}{=} |z_n - q| = \frac{|y_n|}{|x_0|} \leq 2^{-(n-1)} \qquad (20)$$

where q is the exact result. The upper bound on $err_{abs}$ will be referred to as absolute error tolerance.

A relative actual error in computation is given as follows:

$$err_{rel} \stackrel{def}{=} \frac{|z_n - q|}{|q|} = \frac{|y_n|}{|y_0|} \leq \frac{2^{-(n-1)}}{|q|} \qquad (21)$$

Clearly, $err_{rel}$ tends to go up as $q \to 0$. Though increasing n will reduce the $err_{rel}$ introduced, we use a normalization scheme to meet the absolute error requirement with smaller n, and hence need a smaller iterative structure.

Normalization:

To bound the $err_{abs}$ for $r \leq 0.5$, we normalize the inputs $s = sm \cdot 2^{E_s}$ and $t = tm \cdot 2^{E_t}$ such that $1 \leq |sm| \leq 2$ and $1 \leq |tm| \leq 2$. If the absolute error tolerance required is $2^{-(m-1)}$ where $m \gg n$, we normalize the inputs s, t such that $E_s - E_t \geq -(m-n)$. Note that such normalization meets the absolute error tolerance with a small n.

Error Correction:

We add following error connection teen $ec_{div}$ to the result $z_n$.

$$z'_n = z_n + \underbrace{e \cdot 2^{-(n-1)}}_{ec_{mult}} \qquad (22)$$

where e is a real-var in the interval range $[-1, 1]$, introduced for each division instance.

We obtain corresponding error tolerances as follows:

$$err'_{abs} \stackrel{def}{=} |z'_n - q| \leq 2^{-(n-2)} \qquad (23)$$

$$err'_{rel} \stackrel{def}{=} \frac{|z'_n - q|}{|q|} \leq \frac{2^{-(n-2)}}{|q|} \qquad (24)$$

To maintain the precision of n, we need one additional iterative step. Such an error correction is needed to guarantee soundness to the decision procedure.

ENCODING TO SMT (LRA): in block 104, the normalization and error correction are encoded. The encoding of the equations (10-11, 18-19) to SMT (LRA) is straightforward, and therefore, not discussed here.

Encoding Error Correction Terms: The error correction term $ec_{mult} = e \cdot x_0 \cdot 2^{-(n-1)}$ is encoded as follows: we first introduce a real-var $ec_p$ and constraining it such that:

$$(|ec_p| \leq x_0 \cdot 2^{-(n-1)}) \wedge (ec_{mult} = ec_p) \qquad (25)$$

A constraint such as $|g| \leq h$ and g, $h \in R$ is encoded into SMT (LRA) as $(-h \leq g \leq h) \vee (h \leq g \leq -h)$.

As $e \in [-1, 1]$, the above constraints exactly capture the expression of the error correction term. Similarly, the error term $ec_{div} = e \cdot 2^{-(n-1)}$ with $e \in [1, 1]$ is encoded as follows, by first introducing a bool term variable $ec_q$.

$$(|ec_q| \leq 2^{-(n-1)}) \wedge (ec_{div} = ec_q) \qquad (26)$$

Encoding Normalization Constraints: Consider the multiplication $p = s \cdot t$, with $t = tm \cdot 2^{E_t} \in [2^{E_t}, 2^{E_t+1}]$. Let $pm = \text{cordicMult}$ (s,tm) denote the result of the normalized CORDIC multiplication where $1 \leq |tm| \leq 2$. For the given interval bound on t, we obtain the normalization constraints NCp as follows:

$$NCp \stackrel{def}{=} (t = tm \cdot 2^{E_t}) \wedge (p = pm \cdot 2^{E_t}) \qquad (27)$$

If $E_t < -(m-n)$, we use the interval $[-2^{-(m-n)}, 2^{-(m-n)}]$, where $t = tm \cdot 2^{-(m-n)}$.

$$NCp \stackrel{def}{=} (t = tm \cdot 2^{-(m-n)}) \wedge (p = pm \cdot 2^{-(m-n)}) \qquad (28)$$

Note, tm satisfies the domain of convergence bound i.e., $|tm| \leq 2$.

Similarly, consider the division $q = s/t$, with $t = tm \cdot 2^{E_t} \in [2^{E_t}, 2^{E_t+1}]$, and $s = sm \cdot 2^{E_s} \in [2^{E_s}, 2^{E_s+1}]$. Let $qm = \text{cordicDiv}(sm, tm)$ denote the result of the normalized CORDIC division where $1 \leq |sm| \leq 2$ and $1 \leq |tm| \leq 2$. For the given intervals for s, t we obtain the normalization constraints NCqn and NCqd as follows:

$$NCqn \stackrel{def}{=} (s = sm \cdot 2^{E_s}) \wedge (q = qm \cdot 2^{E_s - E_t}) \quad (29)$$

$$NCqd \stackrel{def}{=} (t = tm \cdot 2^{E_t}) \wedge (q = qm \cdot 2^{E_s - E_t}) \quad (30)$$

If $E_s - E_t < -(m-n)$, we use the interval $\lfloor -2^{-(m-n)}, 2^{-(m-n)} \rfloor$, where $s = sm \cdot 2^{-(m-n)}$.

$$NCqn \stackrel{def}{=} (s = sm \cdot 2^{-(m-n)}) \wedge (q = qm \cdot 2^{-(m-n)-E_t}) \quad (31)$$

Note, sm and qm satisfy the domain of convergence bounds i.e., $|sm|, |qm| \leq 2$. However, $1 \leq |tm| \leq 2$. As divide-by zero is not well-defined, this will allow us to handle arbitrary but non-zero precision, $t \neq 0$.

Encoding $\phi$ to $\hat{\phi}$: Consider the decision problem $\phi$ with linear terms and nonlinear terms involving multiplications and divisions. Recall, B and R denote the set of all bool-expr and real-expr in $\phi$. Let $R = R_L \cup R_{NL}$, where $R_L$ and $R_{NL}$ denote the set of linear terms and non-linear terms, respectively. Note, $R_L \cap R_{NL} = \emptyset$. Let $R_{NL} = \{p_1, \ldots, p_i, \ldots, p_u\} \cup \{q_1, \ldots, q_j, \ldots, q_w\}$, where $p_i$ is a multiplication term, $q_j$ is a division term, u and w are the number of multiplication and division terms, respectively.

Now we discuss how to obtain a CORDIC approximation of $\phi$, denoted as $\hat{\phi}$, in the following steps. Let $\hat{B}$ and $\hat{R}$ denote the set of all bool-expr and real-expr in $\hat{\phi}$.

An initialization step is first performed. We include all the linear terms of $\phi$, i.e., $\hat{B} = B$, $\hat{R} = R$. For each multiplication term $p_i = s \cdot t_i \in R_{NL}$, we introduce real-var $tm_i$ and $e_i$, i.e., $\hat{R} = \hat{R} \cup \{tm_i, e_i\}$. We then update $\hat{R}$ and $\hat{B}$ with the Boolean terms and linear terms, arising from the CORDIC structure $pm_i = cordicMult(s, tm_i) + ec_i$, where $ec_i = e_i \cdot s \cdot 2^{-(n-1)}$ as given by Eqs. (10-11, 15). Similar to above, for each division term $q_j = s_j/t_j \in R_{NL}$, we introduce real-vars $sm_j$, $tm_j$, $e_j$, i.e., $\hat{R} = \hat{R} \cup \{sm_j, tm_j, e_j\}$. We then update $\hat{R}$ and $\hat{B}$ with the Boolean terms and linear terms arising from the CORDIC structure $qm_j = cordicDiv(sm_j, tm_j) + ec_j$, where $ec_j = e_j \cdot 2^{-(n-1)}$, as given by Eqs. (18-19, 22). Note, the Boolean-terms arise due to ITE operators. Further, $\hat{R}$ contains only linear terms, including $R_L$ and those arising from CORDIC structure and error correction. The encoded formula $\hat{\phi}$ is related with $\phi$ as stated in the following lemma.

Lemma 1:
If $\phi$ is satisfiable with $\sigma$ valuation, then there exists a satisfying valuation $\hat{\sigma}$ such that $\hat{\sigma}(b) = \sigma(b)$ for every $b \in B$, $\hat{\sigma}(r) = \sigma(r)$ for every $r \in R_L$.

Encoding $\phi$ to $\hat{\phi}$ with Interval Bounds:
Consider $\phi$ with interval bounds on non-linear terms. Specifically, for each multiplication term $p_i = s \cdot t$, define interval bound constraint $IBp_i$ as follows:

$$IBp_i \stackrel{def}{=} \begin{cases} 2^{E_{t_i}} \leq |t_i| \leq 2^{E_{t_i}+1} & E_{t_i} \geq -(m-n) \\ |t_i| \leq 2^{-(m-n)} & \text{otherwise} \end{cases}$$

Similarly, for each division term $q_j = s_j/t_j$, define interval bound constraints $IBqn_j$ and $IBqd_j$ as follows:

$$IBqn_j \stackrel{def}{=} \begin{cases} 2^{E_{t_i}} \leq |t_i| \leq 2^{E_{s_j}+1} & E_{s_j} - E_{t_j} \geq -(m-n) \\ |s_j| \leq 2^{-(m-n)} & \text{otherwise} \end{cases}$$

$$IBqd_j \stackrel{def}{=} 2^{E_{t_j}} \leq |t_j| \leq 2^{E_{t_j}+1}$$

Let IB denote the conjunction of all interval bound constraints corresponding to multiplication and division terms.

$$IB \stackrel{def}{=} \bigwedge_i IBp_i \wedge \bigwedge_j (IBqn_i \wedge IBqd_j) \quad (32)$$

Lemma 2:
If $\phi$ is satisfiable with $\sigma$ valuation, then there exists IB such that $\phi \wedge IB$ is satisfiable. By using suitable normalization, such a combination of interval bound can be obtained. Given IB, we obtain CORDIC approximation $\hat{\phi}|_{IB}^2$ as given by the following equation:

$$\hat{\phi}|_{IB} = \hat{\phi} \wedge \underbrace{\bigwedge_i NCp_i \wedge \bigwedge_j (NCqn_j \wedge NCqd_j)}_{NC} \quad (33)$$

Note, constraints $NCp_i$, $NCqn_j$, $NCqd_j$ are given by Eqs. (27-31).

The encoded formula $\hat{\phi}|_{IB} \wedge IB$ is related with $\phi \wedge IB$ as stated in the following theorem.

Lemma 3:
Given IB as defined above, $\phi \wedge IB \wedge_{SAT} \hat{\phi}|_{IB} \Rightarrow IB$, i.e., the encoding is sound.
Proof. Assume $\phi \wedge IB$ is satisfiable for some $\sigma$ valuation. In the following, we show the satisfiability of $\hat{\phi}|_{IB} \wedge IB$ by constructing a valuation of $\hat{\sigma}$, that is also a model for $\hat{\phi}|_{IB} \wedge IB$.

Using Lemma 1, we obtain $\hat{\sigma}(b) = \sigma(b)$ for every $b \in B$, $\hat{\sigma}(r) = \sigma(r)$ for every $r \in R_L$. We now show that there exists valuation $\hat{\sigma}$ for every $r \in \hat{R} \setminus R_L$ so that $\wedge_i NCp_i \wedge_j (NCqn_j \wedge NCqd_j) \wedge IB$ is satisfiable. Consider $NCp_i$. We assign values $tm_i$ and $pm_i$ as follows:

$$\hat{\sigma}(tm_i) = \sigma(t_i) \cdot 2^{-E_{t_i}},$$

$$\hat{\sigma}(pm_i) = \sigma(p_i) \cdot 2^{-E_{t_i}}.$$

From Eq. (15), we have to satisfy the following equation: $pm_i = cordicMult(s, tm_i) + e_i \cdot s \cdot 2^{-(n-1)}$s. Recall, $e_i \in [-1, 1]$ is a real-var expression. We $$\text{choose } \hat{\sigma}(e_i) = \frac{(\sigma(pm_i) - cordicMult(\sigma(s), \hat{\sigma}(tm_i)))}{(2^{-(n-1)} \cdot \sigma(s))}. \quad (34)$$

As per Eq. (12), $|s \cdot tm_i - cordicMult(s, tm_i)| \div |s| \cdot 2^{-(n-1)}$ for $|tm_i| \leq 2$; therefore, $|\hat{\sigma}(e)| \leq 1$. Given two predicates f and g, we define a constraint (or simplify) operator, denoted as $f|_g$, so that $f|_g = f$ if $g = 1$; otherwise, $f|_g = don't\_care$. Thus, $f|_g \wedge g = f \wedge g$.

Similarly, consider $NCqn_j$, $NCqd_j$. We assign $sm_j$, $tm_j$, and $qm_j$ as follows:

$$\hat{\sigma}(sm_j) = \sigma(s_j) \cdot 2^{-E_{s_j}},$$
$$\hat{\sigma}(tm_j) = \sigma(t_j) \cdot 2^{-E_{t_j}}, \text{ and}$$
$$\hat{\sigma}(qm_j) = \sigma(q_j) \cdot 2^{E_{t_j}-E_{s_j}}.$$

From (22), we have to satisfy the following equation:

$qm_j$=cordicDiv($sm_j,tm_j$)+$e_j \cdot s \cdot 2^{-(n-1)}$, where $e \in [-1,1]$ is a real-var expression. We choose $\hat{\sigma}(e_j)$=($\sigma(qm_i)$−cordicDiv($\sigma(s),\hat{\sigma}(tm_i)$))$\cdot 2^{(n-1)}$. (35)

As per Eq. (20), $|sm_j/tm_j$−cordicDiv($sm_j,tm_j$)$|\leq 2^{-(n-1)}$ for $1\leq|tm_j|\leq 2$ and $|qm_j|, |sm_j|\leq 2$; and therefore, $|\hat{\sigma}(e_j)|\leq 1$. Thus, we obtain a satisfying assignment $\hat{\phi}$ for $\hat{\phi}|_{IB}(\wedge)$ IB.

Theorem 1:
If $\hat{\phi}$ is satisfiable, then $\hat{\phi}(\wedge)$ IB is satisfiable for some IB.

NUMERICAL ACCURACY: Given a satisfying solution for $\hat{\phi}|_{IB}(\wedge)$ IB, the absolute error tolerance in each non-linear operation is bounded for a given m, n, and bounded input/output domain. In the following, we discuss such bounds for multiplication and division.

Multiplication: Consider a multiplier, $p_i=s \cdot t_1$, with $$t_i = tm_i \cdot 2^{E_{t_i}}.$$

We have $pm_i$=cordicMult($s_i,tm_i$)+$e_i \cdot s \cdot 2^{-(n-1)}$, and $$p_i = pm_i \cdot 2^{E_{t_i}}.$$

We consider two cases:
$E_{t_i}>-(m-n)$. We have $1\leq|\hat{\sigma}(tm_i)|\leq 2$ by (27). Absolute error err'$_{abs}$ as given by (16), is $$err'_{abs} \leq |\hat{\sigma}(p_i) - \sigma(p_i)| \leq 2^{-(n-2)-E_{t_i}} \cdot |s| \quad (36)$$

Relative error err'$_{rel}$ is given by (17) is given by $$err'_{rel} \leq \frac{|\hat{\sigma}(p_i) - \sigma(p_i)|}{|\sigma(p_i)|} \leq 2^{-(n-2)} \quad (37)$$

Note, upper bound on the relative error is independent of input values.

$E_{t_i}>-(m-n)$. We have $|\hat{\sigma}(tm_i)|\leq 2$ by (28). Absolute error err'$_{abs}$ as given by (16), is err'$_{abs}\leq|\hat{\sigma}(p_i)-\sigma(p_i)|\leq 2^{-(m-2)} \cdot |s_i|$ (38)

Relative error err'$_{rel}$ as given by (17) is given by $$err'_{rel} \leq \frac{|\hat{\sigma}(p_i) - \sigma(p_i)|}{|\sigma(p_i)|} \leq \frac{2^{-(n-2)}}{|\sigma(tm_i)|} \quad (39)$$

Note, upper bound on absolute error is independent of n, and meets the required precision bound of m. However, the relative error can potentially be unbounded around when the input $tm_i$ approaches zero.

Overall, we find that when the input/output values are large, we bound the relative error in the computation. On the other hand, we bound the absolute error in the computation to meet the desired precisions.

Division: Consider a division operation, $q_j=s_j/t_j$, with $$s_j = sm \cdot 2^{E_{s_j}}, \text{ and}$$
$$t_j = tm \cdot 2^{E_{t_j}}.$$

We have $qm_j$=cordicDiv($sm_j,tm_j$)+$e_j \cdot 2^{-(n-1)}$, and $$q_j = qm_j \cdot 2^{E_{s_j}-E_{t_j}}.$$

We consider two cases:
$E_{t_i}>-(m-n)$. We have $1\leq|\hat{\sigma}(tm_j)|\leq 2$ and $1\leq|\hat{\sigma}(sm_j)|\leq 2$, and $\frac{1}{2}\leq|\hat{\sigma}(qm_j)|\leq 2$, by virtue of (29-30).
Absolute error err$_{abs}$, as given by (23), is $$err'_{abs} \leq |\hat{\sigma}(q_j) - \sigma(q_j)| \leq 2^{-(n-2)+E_{s_j}-E_{t_j}} \quad (40)$$

Relative error err$_{rel}$ is given by (24) is given by $$err'_{rel} \leq \frac{|\hat{\sigma}(q_j) - \sigma(q_j)|}{|\sigma(q_j)|} \leq 2^{-n+3} \quad (41)$$

Note, the upper bound on the relative error is independent of input values.

$E_{t_i}>-(m-n)$. We have $|\hat{\sigma}(sm_j)|\leq 2$, $1\leq|\hat{\sigma}(tm_j)|\leq 2$, and $|\hat{\sigma}(qm_j)|\leq 2$, by virtue of (30-31).
Absolute error err'$_{abs}$ as given by (23), is err'$_{abs}\leq|\hat{\sigma}(q_j)-\sigma(q_j)|\leq 2^{-(m-2)}$ (42)

Relative error err'$_{rel}$ as given by (24) is given by $$err'_{rel} \leq \frac{|\hat{\sigma}(q_j) - \sigma(q_j)|}{|\sigma(q_j)|} \leq \frac{2^{-(n-2)}}{|\sigma(qm_j)|} \quad (43)$$

Note, upper bound on absolute error is independent of n, and meets the required precision.

Overall, we find that when the output values are large, we bound the relative error in the computation. On the other hand, when the output value approaches zero, we bound the absolute error in the computation to meet the desired precision. Such error tolerances are generally accepted.

In block 104 of FIG. 1, a DPLL-based interval search engine (DISE) incrementally constraints the formula with interval bound constraints. We first present the basic search guidance strategy. To exploit incremental solving capability of the recent SMT (LRA) solvers, we do not want to re-encode the entire formula when some interval bounds change. Re-encoding of the formula looses all the information that was learned in the previous run. We describe a simple mechanism that will be the basis of our guidance strategy in DISE.

Consider a SMT (LRA) formula $\psi=\psi_H(\wedge)\psi_S$, where we would like the SMT (LRA)-solver to satisfy $\psi_H$, but it may choose not to satisfy $\psi_S$; thereby, reporting satisfiable or unsatisfiable based on the check for $\psi_H$ alone. We refer to such constraints $\psi_H$ as hard constraints, and $\psi_S$ as soft constraints. An SMT (LRA)-solver provides such checking capability, where $\psi_S$ constraints can be asserted with some finite weights, and $\psi_H$ can be asserted with infinite weights, and the solver finds a weighted model. In one implementation, unweighted asserted constraints are considered to have infinite weights. If $\psi_H$ is unsatisfiable, $\psi$ is returned unsatisfiable. However, if $\psi$ is returned satisfiable, $\psi_S$ may not be satisfiable. In such a case, one can use the model values of variables in $\psi_S$ to analyze which constraints in $\psi_S$ are unsatisfiable/satisfiable. One can use that information to "modify" the constraints $\psi_S$.

We use this simple mechanism to guide our interval search. In our approach, we heuristically chose combinations of interval bounds that will constitute $\phi_S$. Note, an unsat core analysis can not be used for solution-based guidance.

Before we present the search procedure, we describe the input problem and notations used. Assume we have a given non-linear decision problem $\phi$ with interval bounds on non-linear terms. We refer this interval bounds as external and differentiate them with interval bounds IB Eq. (32), which we refer as internal. Note that such external bounds need not be provided explicitly. One can derive safe bounds from the other relation operations in $\phi$ with given precision requirements. If no such bounds exist for non-linear terms, i.e., they are unbounded, one can remove the non-linear terms from $\phi$ without affecting its satisfiability outcome.

Specifically, for each multiplication term $p_i = s \cdot t_i$, let the external interval bound constraint $xIBp_i$ correspond to an interval such that $t_i \in [\underline{t_i}, \overline{t_i}]$. Similarly, for each division term $q_j = s_j / t_j$, let the external interval bound constraint $xIBqn_j$ and $xIBqn_j$ correspond to intervals such that $s_j \in [\underline{s_j}, \overline{s_j}]$ and $t_j \in [\underline{t_j}, \overline{t_j}]$, respectively.

Let xIB denote conjunction of all the external interval bound constraints corresponding to each multiplication and division.

$$xIB \stackrel{def}{=} \bigwedge_i xIBp_i \wedge \bigwedge_j (xIBqn_j \wedge xIBqd_j) \quad (44)$$

$\hat{\phi}$ denotes SMT (LRA) formula including the linear-part of $\phi$ and the translated part of non-linear expression, obtained after CORDIC approximation as described in above. The procedure DISE takes a formula $\hat{\phi} (\wedge) xIB$ and outputs UNSAT, or SAT with a satisfying model. The procedure invokes a SMT (LRA)-solver for consistency checks of $$\psi \stackrel{def}{=} \hat{\phi} \wedge xIB \wedge NC \wedge IB,$$

where IB is given by Eq. (32) and NC is given by Eq. (33). The solver incrementally asserts/retracts each interval constraints as guided by the search strategy described above.

As noted before, we do not want to re-encode the entire formula when some bounds change. Therefore, we choose not to change the constraints $\hat{\phi} (\wedge) xIB$. We assert them as hard constraints during the entire search process. However, as we add/remove the individual constraints of NC and IB, we change some of the constraints IB and NC from soft to hard (in a forward decision step) and hard to soft (in a backtracking step). Note, the goal is to find some interval bounds IB that will satisfy the given formula, or to show that no such satisfying interval bounds exists (in which case, the formula $\phi (\wedge) xIB$ is unsatisfiable).

Let $\Omega$ be the set of possible interval bounds constraints used as decision candidates, i.e., $$\Omega = \left\{ \begin{array}{l} IBp_1 \wedge NCp_1, \ldots IBp_u \wedge NCp_u, IBqn_1 \wedge NCqn_1 \\ \ldots IBqn_w \wedge NCqn_w, IBqd_1 \wedge NCqd_1 \ldots IBqd_w \wedge NCqd_w \end{array} \right\}.$$

Note, each $w(r, p) \in \Omega$ is a Boolean predicate on a real term r, and an interval bound p.

Let $C \subseteq \Omega$ be the set of interval bound constraints that have been chosen (i.e., decided) up to the current decision level. The constraints in the set will be asserted as hard constraints. We also refer the set C as a committed set. Let $U = \Omega \backslash C$, denotes an uncommitted set. The constraints in the set will be asserted as soft constraints. Let $\epsilon$ denote the learned constraints such that $\neg \epsilon$ corresponds to the interval bounds with no solution, as established in the previous searches. This constraint will be asserted as hard constraints.

DISE proceeds in a DPLL-style with backtracking as follows: Initially, $U = \theta$, $C = \Omega$, $\epsilon$=false. At a particular decision level (starting from 0), it selects a soft constraint $v \in U$, and asserts as a hard constraint. The formula $\psi$ constructed as such is shown in Eq. (45). SMT(LRA)-solver then checks the consistency of $\psi$.

$$\psi = \underbrace{\hat{\phi} \wedge xIB}_{hard} \wedge \underbrace{\bigwedge_{w \in C} w}_{hard} \wedge \underbrace{\bigwedge_{v \in U} v}_{soft} \wedge \underbrace{\epsilon}_{hard} \quad (45)$$

Based on the results of SMT (LRA)-solver on $\psi$, DISE makes one of the following actions.

Case 1. If $\psi$ is satisfiable and $C = \theta$, the procedure returns SAT.

Case 2. If $\psi$ is unsatisfiable and $U = \theta$, the procedure returns UNSAT.

Case 3. If $\psi$ is satisfiable and $U \neq \theta$, the procedure does the following:

If all $v(r, p)$ are true, the procedure returns SAT; otherwise, for each $v(r, p) \in U$ such that v is false, the interval bound of corresponding variable r is adjusted to p' such that $\sigma(r) \in p'$ and $v(r, p')$ is satisfied.

Picks $v(r, p) \in U$ as the next decision; Updates C, U i.e., $C \leftarrow C \cup \{v\}$, and $U \leftarrow U \backslash \{v\}$ Case 4. If $\psi$ is unsatisfiable and $C \neq \theta$, the procedure does the following:

It constructs a conjunction of an infeasible combination constraints, i.e., $IC = (\wedge)_{w \in C} w$. It then updates the constraints set $\epsilon$ as follows: $\epsilon \leftarrow \epsilon \wedge \neg IC$. Note, this partial combination of interval bounds will not be explored by the solver in the future.

It backtracks to the previous decision level. Let $\zeta$ denote the last decision. It updates C and U: $C \leftarrow C \backslash \{\zeta\}$, $U \leftarrow U \cup \{\zeta\}$.

CORD: Decision Procedure: The overall decision procedure CORD using DISE is represented in pseudo-code in Method 1. In Method 1, we employ the procedure CORDIC_Translate to obtain CORDIC translation as described above. We use a Stack for recording and backtracking purposes. We assume that the following procedures are supported in the SMT (LRA)-solver to allow incremental formulation of sub-problems:

SMT_Init: to add initial set of logical expressions

SMT_Assert to assert constraints with infinite weights (i.e., hard constraints), which can be retracted later SMT_Assert_Weighted: to assert constraints with weights (i.e., soft constraints), which can be retracted later SMT_Retract: to retract previously added constraints SMT_Find_Weighted_Model: to check the satisfiability of non-weighted constraintse Theorem 2:

The decision procedure CORD always terminates, decides unsatisfiability results correctly, and satisfiability results correctly within the given precision requirements.

Method 1:

---
CORD: CORDIC-based Decision Procedure
---

```
1:  input: Non-linear decision problem φ with external interval bounds on
       non-linear inputs, i.e., φ∧χIB .
2:  output: SAT/UNSAT
3:
4:     φ̂∧CORDIC _Translate(φ) {Sec. III}
5:     SMT_Init(φ̂∧χIB) {Encode to SMT(LRA). Sec. IV}
6:     C := θ {committed set ⊆ Ω }
7:     U := Ω {uncommitted set Ω\C ]
8:     Stack_ Init() {Initialize the decision stack}
9:
10: for all w(r,p)∈ Ω do
11:     p=[1,2] {Initial interval bound for non-linear input r}
12:     SMT_Assert_Weighted (w(r,p),wt){r ∈ p}
13: end for
14:
15: {DISE: DPLL-based Interval Search Engine}
16:
17: loop
18:     {Invoke SMT(LRA)-solver}
19:     is_sat := SMT_Find_Weighted_Model ()
20:
21:     {Case 1}
22:     if (is_sat = true) and (U = θ) then
23:        return SAT {All bounds are satisfied}
24:     end if
25:
26:     {Case 2}
27:     if (is_sat = false) and (C = θ) then
28:        return UNSAT {Unsatisfiable without IB }
29:     end if
30:
31:     {Case 3: update bounds, decide}
32:     if (is_sat = true) and (U ≠ θ) then
33:        Let σ̂ the weighted model found
34:        num_update := 0 {number of interval updates}
35:        for all v(r,p)∈ U s.t. σ̂(v(r,p)) = false do
36:           Select p' = [r,r̄] s.t. σ̂(v(r , p')) = true
37:           SMT_Retract (v(r,p)) {retract old bound}
38:           SMT_Assert_Weighted(v(r,p'),wt){r ∈ p'}
39:           num_update++; {increase the update count}
40:        end for
41:        if (num_update = 0) then
42:           return SAT {all model values are satisfying}
43:        end if
44:        Pick w(r,p)∈ U {Decide}
45:        C := C∪ w, U := U\{w}. {update C and U}
46:        Stack_push(w) {Store the last decision}
47:     end if
48:
49:     {Case 4: backtrack, add blocking constraint}
50:     if (is_sat = false) and (C ≠ θ) then
51:        IC :=∧_{weC} w(r,p) {infeasible combination}
52:        SMT_Assert (¬IC) {block infeasible region}
53:        U :=U ∪ w, C := C\{w} {update C and U]
54:        Stack_pop() {remove the last decision}
55:     end if
56: end loop
```

A novel decision procedure CORD for linear/non-linear constraints using CORDIC methods has been provided. A safe translation to a SMT(LRA) formula is obtained, accounting for the inaccuracies in CORDIC approximation. We then perform a DPLL-style interval search (DISE) on the encoded formula using an off-the-shelf SMT(LRA)-solver. We use a guidance mechanism for the interval search for a faster resolution. The decision procedure is guaranteed to be sound. For a given allowed precision loss, and bounded non-linear inputs, the decision procedure is also complete. We also presented upper bounds on absolute and relative errors due to CORDIC approximation in a satisfying solution. The present approach is useful for handling non-linear arithmetic for both hardware and software verification methodologies.

Figure 2:
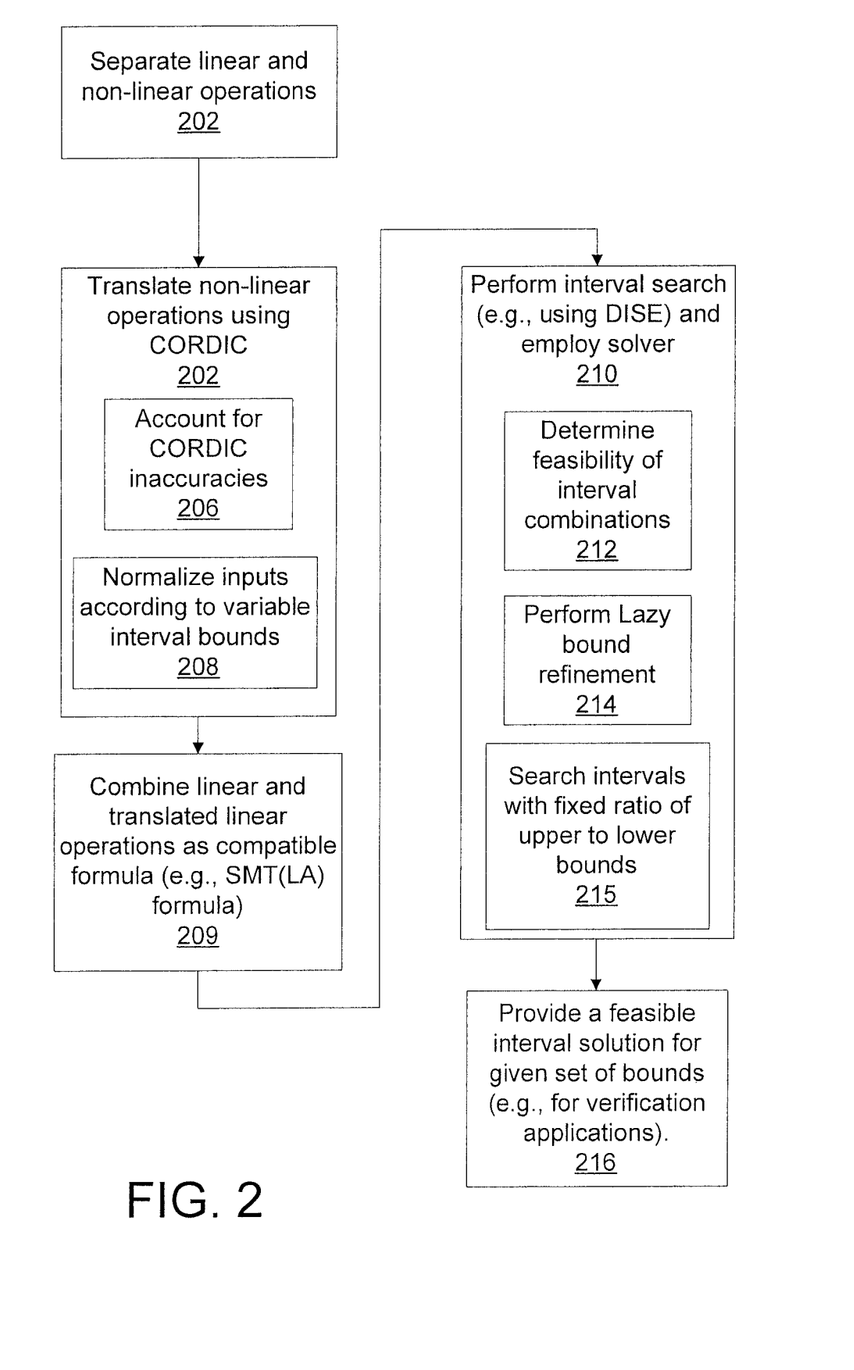
FIG. 2 is a block/flow diagram for a system/method for solving a decision problem in a program having Boolean combinations of linear and non-linear operations in accordance with the present principles.

Referring to FIG. 2, a system/method for solving a decision problem having Boolean combinations of linear and non-linear operations is illustratively shown. In block 202, Boolean combinations are separated into linear operations and non-linear operations. In block 204, the non-linear operations are translated using a CORDIC method programmed on a computer device to provide linearized operations preferably compatible with a SMT(LRA). The non-linear operations may include any function including transcendental and algebraic functions over real numbers with a given precision.

In block 206, inaccuracies in the CORDIC method are accounted for by computing error correction. In block 208, a linearized formula for the linearized operations may be reduced in size by normalizing inputs to the formula according to variable interval bounds. In block 209, the linear and translated non-linear operations are combined as compatible formulas (e.g., compatible with SMT(LA)).

In block 210, an interval search is performed using a DPLL-style interval search (DISE) or other method to determine a satisfiable interval range to provide a sound solution to the decision problem for the interval range. In block 212, performing the interval search includes determining feasibility of interval combinations in conjunction with translated linearized operations and the linear operations. In block 214, a lazy bound refinement may be included and employs a refinement-based reasoning to explore combinations of interval bounds. In block 215, interval bounds are searched with a fixed ratio of upper to lower bounds in the solution. The variable interval bounds are determined iteratively by determining the upper and lower bounds using bound refinement employing results from previous iterations. The lazy bound refinement may also use a branch and bound-style interval search wherein infeasible interval combinations are learned from previous iterations, and not visited in a subsequent search and wherein partial feasible interval combinations from previous iterations are used in guiding the subsequent search. In block 216, a feasible interval solution is provided given a set of bounds. A decision solution is provided for hardware or software verification.

In one embodiment, a model with linear and non-linear operations and specified properties is checked by Bounded Model Checking. This includes unrolling the model to a predetermined depth. The translation step includes translating the unrolled model and properties into a formula with linear and non-linear operations. A satisfiability check is performed on the formula, and correctness of the model is verified with respect to the specified properties.

Having described preferred embodiments of a system and method for efficient decision method for real non-linear arithmetic constraints (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for solving a decision problem having Boolean combinations of linear and non-linear operations, comprising:
    translating the non-linear real operations using a COordinate Rotation DIgital Computer (CORDIC) method programmed on a computer device into linear operations maintaining a given accuracy;
    combining linear and translated linear operations into a formula; and
    solving satisfiability of the formula using a decision procedure for Boolean combinations of linear operations over integers and reals.

2. The method as recited in claim 1, wherein translating includes normalizing one or more non-linear inputs with respect to corresponding variable interval bounds.

3. The method as recited in claim 2, wherein the variable interval bounds on the non-linear inputs have a fixed ratio of upper to lower bounds.

4. The method as recited in claim 1, wherein the decision procedure includes an interval search procedure that determines whether the formula is satisfiability or not based on whether a feasible combination of interval bounds exists or not, respectively.

5. The method as recited in claim 4, wherein the interval search procedure determines the feasibility of interval combinations of the non-linear inputs by searching over lower and upper bounds of the interval iteratively, by employing results from previous iterations.

6. The method as recited in claim 4, wherein the interval search procedure includes employing a lazy bound refinement that employs refinement-based reasoning iteratively to explore combinations of interval bounds.

7. The method as recited in claim 6, wherein the lazy bound refinement uses a branch and bound-style interval search wherein infeasible interval combinations are learned from previous iterations, and not visited in a subsequent search.

8. The method as recited in claim 7, wherein the lazy bound refinement uses a branch and bound-style interval search wherein partial feasible interval combinations from previous iterations are used in guiding the subsequent search.

9. The method as recited in claim 1, further comprising accounting for inaccuracies in the CORDIC method by computing error correction and including error correction terms in the translating step.

10. The method as recited in claim 1, wherein the non-linear operations include transcendental and algebraic functions over real numbers with a given precision.

11. The method as recited in claim 1, wherein the decision procedure includes employing a Satisfiability Modulo Theory for Linear Arithmetic solver (SMT(LA)).

12. The method as recited in claim 1, further comprising verifying the linear and non-linear operations in computer software.

13. The method as recited in claim 1, wherein method includes checking a model with linear and non-linear operations and specified properties by Bounded Model Checking, by unrolling the model for a pre-determined depth; translating the unrolled model and properties into a formula with linear and non-linear operations; performing a satisfiability check on the formula; and verifying correctness of the model with respect to the specified properties.

14. The method as recited in claim 1, further comprising handling non-linear arithmetic for at least one of hardware and software verification.

15. A computer readable storage medium comprising a computer readable program for solving a decision problem having Boolean combinations of linear and non-linear real operations, wherein the computer readable program when executed on a computer causes the computer perform the steps of:
    translating the non-linear real operations using a COordinate Rotation DIgital Computer (CORDIC) method programmed on a computer device into linear operations maintaining a given accuracy;
    combining linear and translated linear operations into a formula; and
    solving satisfiability of the formula using a decision procedure for Boolean combinations of linear operations over integers and reals.

16. A system for solving a decision problem having Boolean combinations of linear and non-linear operations, comprising:
    a computer configured to translate non-linear real operations using a COordinate Rotation DIgital Computer (CORDIC) method programmed on the computer into linear operations maintaining a given accuracy, the computer configured to combine linear and translated linear operations into a formula; and
    a Satisfiability Modulo Theory for Linear Arithmetic solver (SMT(LA)) configured to solve satisfiability of the formula wherein the solving includes at least one of normalizing one or more non-linear inputs with respect to corresponding variable interval bounds and solving the formula by an interval search procedure that determines whether the formula is satisfiable or not based on whether a feasible combination of interval bounds exists or not, respectively.

17. The system as recited in claim 16, further comprising error correction terms to account for inaccuracies in the CORDIC method.

18. The system as recited in claim 16, wherein the interval search includes a lazy bound refinement that employs refinement-based reasoning to explore combinations of interval bounds.

* * * * *